C. O. MASON.
WINDMILL WHEEL.
APPLICATION FILED JUNE 10, 1913.
1,089,239.
Patented Mar. 3, 1914.
3 SHEETS—SHEET 3.
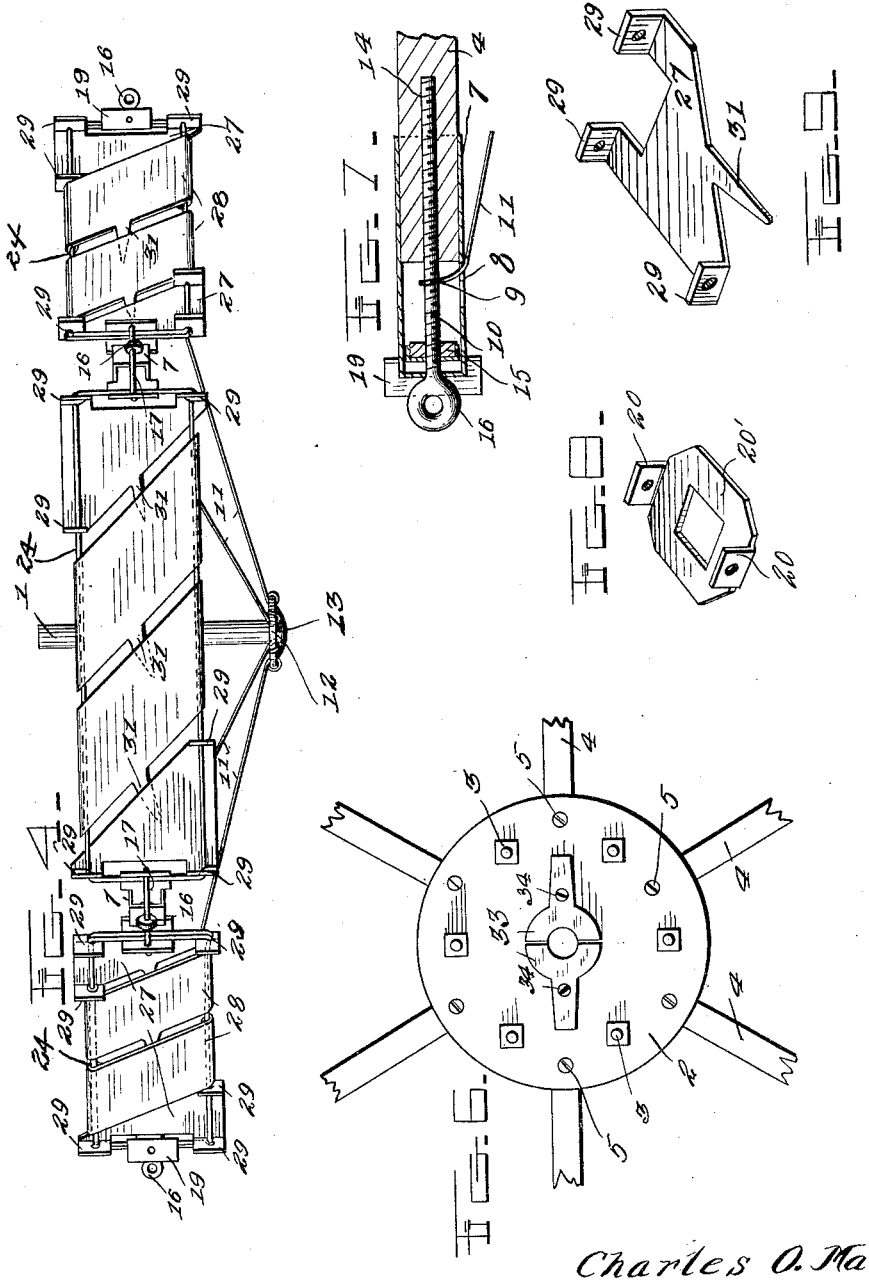
Charles O. Mason,
INVENTOR.
WITNESSES:
BY 
ATTORNEY.

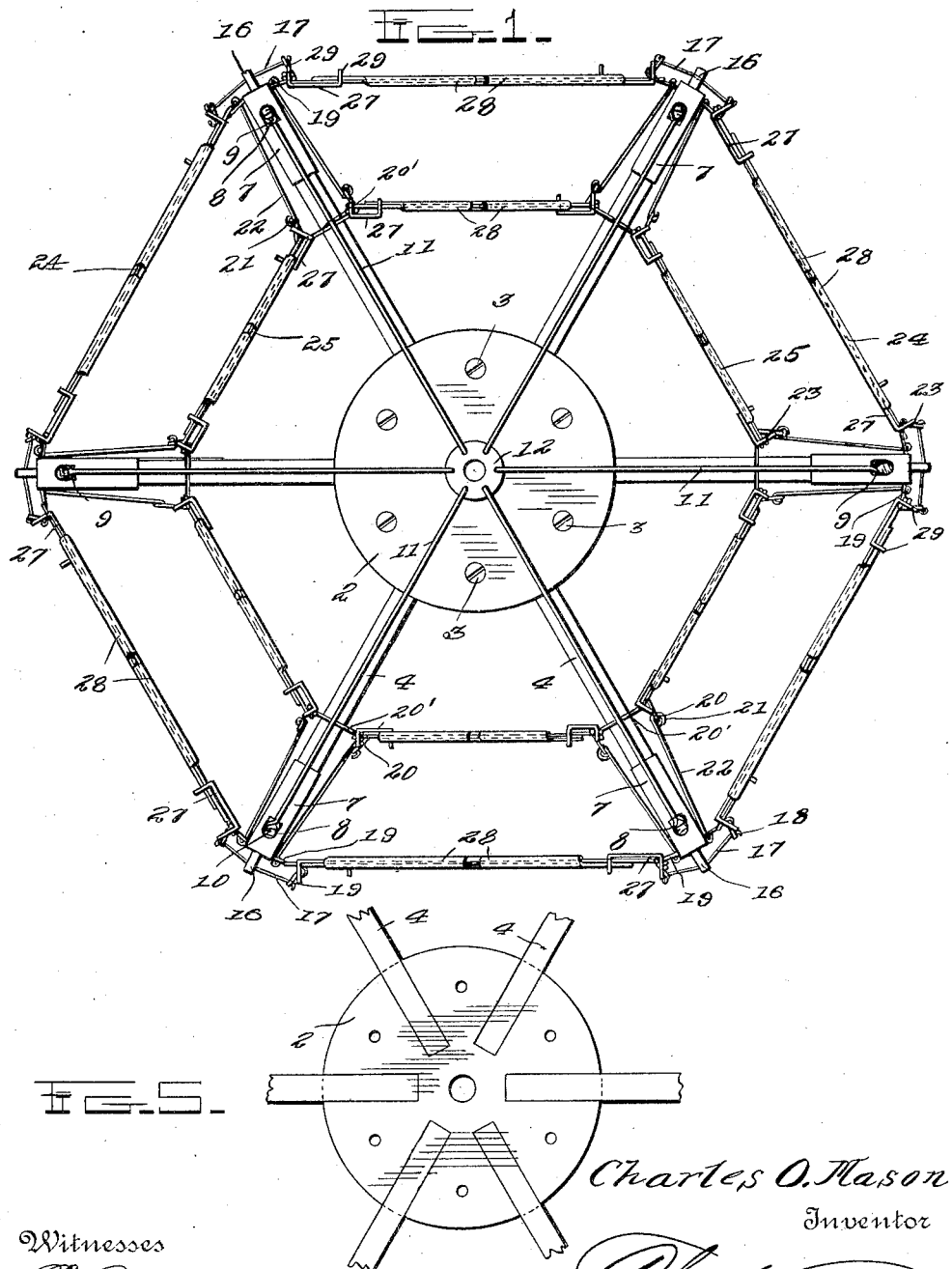

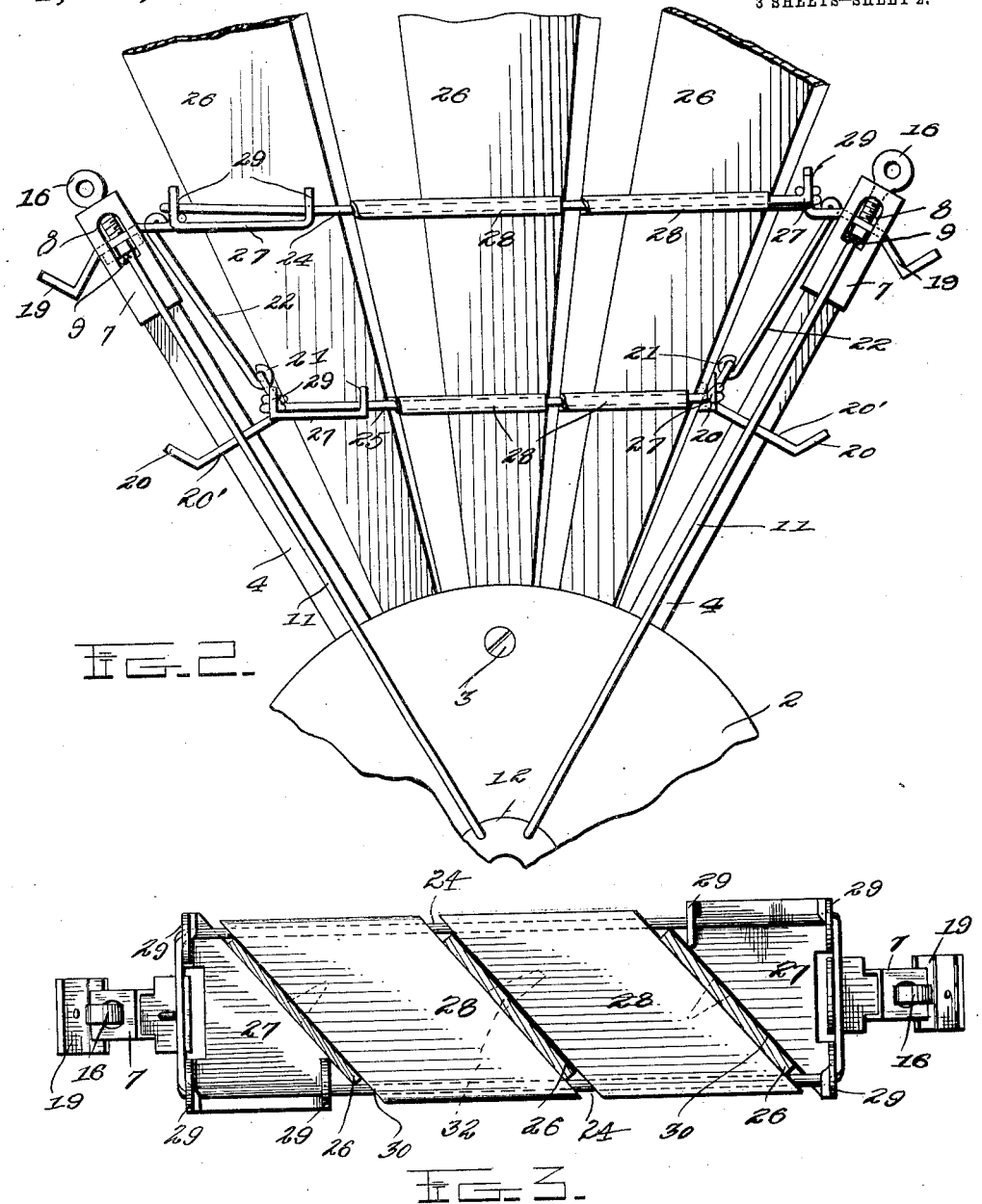

UNITED STATES PATENT OFFICE.

CHARLES O. MASON, OF TEXHOMA, TEXAS.

WINDMILL-WHEEL.

1,089,239.　　　　Specification of Letters Patent.　　Patented Mar. 3, 1914.

Application filed June 10, 1913.　Serial No. 772,796.

*To all whom it may concern:*

Be it known that I, CHARLES O. MASON, a citizen of the United States, residing at Texhoma, in the county of Sherman and State of Texas, have invented certain new and useful Improvements in Windmill-Wheels, of which the following is a specification.

My invention relates to improvements in wind mills, and are particularly directed to the construction of the wheel, one object of my invention being the provision of a wheel which in mounting or securing the blades upon the hub or supporting structure will dispense entirely with the bolts or like fastenings at present in use, and thus enable the blades to be easily applied or removed and obtain a greater life to the wheel.

Another object of my invention is the provision of a wind mill wheel which can be easily assembled or taken apart but will be strong and durable, which while light in weight will possess great strength and which will present the blades in proper position to receive the full effect of the wind.

Another object of my invention is the provision of a wind mill wheel which will be thoroughly efficient in every particular, which can be manufactured at a low price all things considered, and which will be entirely practical.

With these objects in view my invention consists of a wind mill wheel embodying novel features of construction and combination of parts substantially as shown, described and particularly defined by the claims.

Figure 1 represents a front or face view of my complete improvement, the blades not being shown. Fig. 2 represents a front elevation taken on an enlarged scale showing a section of the wheel with the series of blades mounted therein. Fig. 3 represents a top plan view of one of the sections, also on an enlarged scale with the blades shown in section and in position. Fig. 4 represents a side elevation of my complete invention upon its shaft, with the blades removed. Figs. 5 and 6 represent detail views of the hub of my improvement, and Figs. 7, 8, and 9 represent detail views on an enlarged scale of parts of my wheel to more clearly illustrate the details of construction.

Referring by numerals to the drawings in which similar characters of reference are employed to denote like parts in all the figures: The numeral 1, designates the shaft of the mill upon which is mounted the two members 2, which are spaced apart and connected by fastenings or bolts 3, and between which members which form the hub are received the inner ends of the arms or spokes 4, which are rigidly secured in place by fastenings or bolts 5. This construction forms a hub with spokes which while light in weight is very strong and durable, and upon the ends of the arms or spokes are fitted the sleeves or caps 7, each having an opening 8, in one side to admit the loop 9 on brace 11, which encircles the threaded rod 10, and the inner end of said brace 11, is secured to the ring 12, which fits upon the shaft and abuts against the cap 13, of the shaft, and this construction provides a brace between the spokes of the wheel and the shaft. The threaded rods fit in sockets or seats 14, of the spokes and have thereon clamping nuts 15, and are provided at their outer portion with eyes 16, which eyes receive the tension rods 17, which have their ends formed with hooks 18, which engage the ends of the plates 19, which fit within the caps or sleeves, and said plates are engaged by the said clamping nuts 15, and to these plates and to the eyes or hooks 20, on the inner series of plates 20′, are connected the hooked ends 21, of the rods 22, and from this construction it will be observed that to each spoke or arm is connected an upper and lower set of plates, which are secured together by the series of hooked rods 22, and that the action of the screw rods serves to adjust and retain these supporting plates in position upon the spokes. The series of plates are each provided with a lug 23, and around these lugs pass the open wire supporting frames 24, and 25, which supporting frames provide practically the structure which receives the blades or wings 26, said blades or wings being retained in position by the series of engaging plates 27, and 28, which are formed with lugs 29, to receive and be guided upon said wire frames and also have their opposite faces 30 inclined and provided with pins or prongs 31, which are adapted to pass through openings 32, of the wings to secure the wings in place, these forming the fastening devices of my wheel and dispensing with the use of bolts or similar fastenings. It will be understood that the series of upper and lower frames are provided with these fastening plates and that they are of the proper width to receive and accommodate the wings which wings or blades when in position have the appearance shown in Fig. 2.

For the purpose of taking up wear between the shaft and bearing of the hub I employ the pair of members 33, which may be adjusted by means of the fastenings 34, and be caused to always bear tightly upon the shaft.

From the foregoing description taken in connection with the drawing the construction and operation of my wheel will be readily understood, and it will be observed that I provide a hub which supports the arms or spokes which are properly braced or sustained, and that I provide a supporting structure for the wings or blades which will receive and retain the blades in proper shape and dispense with bolts or similar means, and that the wings after being inserted can be rigidly secured by means of the adjusting devices and their connection and that the general construction of the wheel is practical and reliable in every particular.

The open wire supporting frames are shown with a pair of end and a pair of intermediate fastening plates between which are secured in inclined position the wings or blades, but it will be understood that any number of these clamping plates may be employed according to the number of wings or blades constituting the wheel.

In applying the blades the supporting frames are moved by turning the screws or threaded rods and after the wings have been applied the adjusting rods are operated to clamp the plates in proper position and when in this position the tension rods which pass through the eyes of the adjusting rods serves to hold all parts in adjusted position.

The frames 24 and 25 may be made of rigid material or they may be made of flexible material, such as a chain or cord, which construction would permit of the folding or collapsing of the frames to enable easy packing or storing.

I claim:

1. A wind mill wheel, consisting of the hub and radial arms, screws or adjusting rods mounted in said arms, nuts on said screws, clamping plates engaged by said screws and nuts, an outer series of blade supporting frames connected to said plates, an inner series of plates connected with said outer series of plates, an inner series of blade supporting frames connected with said inner series of plates, and blades mounted and retained in said series of supporting frames.

2. A wind mill wheel, consisting of the hub having the supporting arms, a series of wing supporting frames mounted upon said arms, means for engaging and securing the wings carried by said frames, adjusting and securing means for the frame mounted in said arms, a shaft upon which the hub is mounted, and braces leading from the shaft to said arms.

3. A wind mill wheel, consisting of the hub, the arms supported in the hub, the wing supporting frames connected with said arms, the adjusting rods mounted in the arms and formed with eyes, the clamping plates mounted upon said adjusting rod and connected with the wing supporting frames, and the tension rods passing through the eyes of the adjusting rods and connected to said clamping plates.

4. A wind mill wheel, consisting of the hub and radial arms, the caps mounted on the outer ends of said arms and provided with openings, the braces having one end connected to said rods and passing through the opening of said caps, a plate secured to the other ends of said braces, and the wing supporting frames connected with the radial arms, and having means to secure the wings.

5. A wind mill wheel, consisting of the hub and radial arms, the caps on said arms, the adjusting rods engaging the caps and arms, the clamping nuts and plates on the adjusting rods, the inner series of plates, the rods connecting said clamping and inner series of plates, the inner and outer series of open wire frames connected to said clamping and inner plates, the wing engaging plates mounted upon said wire frames, the wings retained between said plates, and means for retaining the adjusting rods in proper position to secure the wings, frames and connections in place.

In testimony whereof I affix my signature in presence of two witnesses.

CHARLES O. MASON.

Witnesses:
W. C. TERRY,
W. E. BENSON.

Copies of this patent may be obtained for five cents each, by addressing the "Commissioner of Patents, Washington, D. C."